United States Patent
Kecht et al.

(10) Patent No.: US 9,409,434 B2
(45) Date of Patent: Aug. 9, 2016

(54) SECURITY FEATURE

(75) Inventors: Johann Kecht, München (DE); Kai Uwe Stock, Grünwald (DE); Stephan Steinlein, München (DE)

(73) Assignee: Giesecke & Devrient GmbH, Munich (DE)

(*) Notice: Subject to any disclaimer, the term of this patent is extended or adjusted under 35 U.S.C. 154(b) by 859 days.

(21) Appl. No.: 13/808,840

(22) PCT Filed: Dec. 23, 2010

(86) PCT No.: PCT/EP2010/007916
§ 371 (c)(1),
(2), (4) Date: Jan. 7, 2013

(87) PCT Pub. No.: WO2012/003854
PCT Pub. Date: Jan. 12, 2012

(65) Prior Publication Data
US 2013/0106090 A1    May 2, 2013

(30) Foreign Application Priority Data
Jul. 9, 2010 (DE) .......................... 10 2010 026 627

(51) Int. Cl.
*G01N 21/64* (2006.01)
*B42D 15/00* (2006.01)
(Continued)

(52) U.S. Cl.
CPC ............ *B42D 15/00* (2013.01); *C09K 11/7701* (2013.01); *C09K 11/7703* (2013.01);
(Continued)

(58) Field of Classification Search
CPC ........... B42D 15/00; G01N 21/64; G03C 1/00
USPC ........ 250/361 R, 362, 363.01, 365, 366, 367, 250/459.1
See application file for complete search history.

(56) References Cited

U.S. PATENT DOCUMENTS

| 4,452,843 A | 6/1984 | Kaule et al. |
| 4,786,813 A * | 11/1988 | Svanberg .................. G01J 3/02 250/458.1 |

(Continued)

FOREIGN PATENT DOCUMENTS

| DE | 10 2004 034 189 A1 | 2/2006 |
| EP | 0 052 624 B1 | 1/1985 |

(Continued)

OTHER PUBLICATIONS

Cantelar E. et al., "Dynamics of the Yb3+ to Er3+ energy transfer in LiNbO3", Applied Physics B, Lasers and Optics, vol. 69, pp. 29-33, Feb. 24, 1999.

(Continued)

*Primary Examiner* — David Porta
*Assistant Examiner* — Djura Malevic
(74) *Attorney, Agent, or Firm* — Workman Nydegger (57) ABSTRACT

The invention relates to a security feature with a luminescent pigment which has a host lattice doped with a luminophore and which is optically excitable to emit luminescent light. The luminescent light of the luminescent pigment has a luminescence spectrum with a first luminescence peak and a second luminescence peak whose peak intensities respectively depend on an amount fraction x of the luminophore in the luminescent pigment. In the luminescent pigment according to the invention, the host lattice and the luminophore and the amount fraction x of the luminophore are chosen such that even a slight increase or reduction of the amount fraction x of the luminophore causes a strong relative change of the peak intensities $I_A$ and $I_B$. This increases the forgery-proofness of the luminescent pigment according to the invention.

15 Claims, 2 Drawing Sheets

(51) Int. Cl.

| | | |
|---|---|---|
| C09K 11/77 | (2006.01) | |
| G07D 7/12 | (2016.01) | |
| B42D 25/29 | (2014.01) | |
| B42D 25/382 | (2014.01) | |
| B42D 25/387 | (2014.01) | |

(52) U.S. Cl.
CPC ......... *C09K11/7756* (2013.01); *C09K 11/7774* (2013.01); *G07D 7/122* (2013.01); *B42D 25/29* (2014.10); *B42D 25/382* (2014.10); *B42D 25/387* (2014.10)

(56) References Cited

U.S. PATENT DOCUMENTS

| | | | |
|---|---|---|---|
| 5,611,958 A | 3/1997 | Takeuchi et al. | |
| 6,330,939 B1 | 12/2001 | Pratt | |
| 6,339,950 B1 * | 1/2002 | Bengsch | G01J 3/28 |
| | | | 73/23.35 |
| 6,383,618 B1 * | 5/2002 | Kaule | B41M 3/144 |
| | | | 252/301.4 R |
| 6,654,395 B1 * | 11/2003 | Naftaly | C03C 3/247 |
| | | | 372/39 |
| 7,075,707 B1 | 7/2006 | Rapaport et al. | |
| 7,894,050 B2 * | 2/2011 | Ashdown | G01J 3/36 |
| | | | 356/224 |
| 7,960,688 B2 * | 6/2011 | Agrawal | G06K 19/14 |
| | | | 250/271 |
| 7,999,237 B2 | 8/2011 | Schwenk et al. | |
| 8,734,679 B2 * | 5/2014 | Marguerettaz | B41M 7/0081 |
| | | | 106/31.13 |
| 2003/0032192 A1 | 2/2003 | Haubold et al. | |
| 2003/0049850 A1 * | 3/2003 | Golden | C25D 3/38 |
| | | | 436/56 |
| 2007/0096057 A1 | 5/2007 | Hampden-Smith et al. | |
| 2007/0202352 A1 * | 8/2007 | Giering | B42D 25/29 |
| | | | 428/690 |
| 2008/0024771 A1 * | 1/2008 | Crawford | C09D 11/30 |
| | | | 356/230 |
| 2008/0032143 A1 * | 2/2008 | Crawford | C09D 101/28 |
| | | | 428/464 |
| 2008/0116272 A1 * | 5/2008 | Giering | G07D 7/122 |
| | | | 235/439 |
| 2008/0116786 A1 * | 5/2008 | Wang | C09K 11/0883 |
| | | | 313/503 |
| 2008/0152826 A1 * | 6/2008 | Crawford | C09K 11/7705 |
| | | | 427/466 |
| 2008/0206486 A1 * | 8/2008 | Crawford | C09D 101/28 |
| | | | 427/595 |
| 2008/0217578 A1 * | 9/2008 | Crawford | C01F 11/22 |
| | | | 252/301.4 H |
| 2009/0267027 A1 | 10/2009 | Takahara et al. | |
| 2009/0289546 A1 * | 11/2009 | Igarashi | C09K 11/7734 |
| | | | 313/503 |
| 2010/0163747 A1 | 7/2010 | Schwenk et al. | |
| 2012/0138856 A1 * | 6/2012 | Haubrich | C09K 11/7769 |
| | | | 252/301.4 R |

FOREIGN PATENT DOCUMENTS

| | | |
|---|---|---|
| WO | 02/20696 A1 | 3/2002 |
| WO | 03/054259 A1 | 7/2003 |

OTHER PUBLICATIONS

Gaume R., et al., "Optical and Laser properties of Yb: YzSiO5 single crystals and discussion of the figure of merit relevant to compare ytterbium-doped laser materials", Optical Materials, vol. 19, pp. 81-88, 2002.

Mitchell, et al.; "A structural study of perovskite series Na0.75Ln0.25Ti0.5Nb0.5O3" Journal of Solid State Chemistry 178, pp. 2586-2593(Sep. 1, 2005).

Balakrishnaiah R et al: "Frequency upconversion fluorescence studies of Er3+/Yb3+ codoped KNbO3 phosphors", Thin Solid Films, Elesvier-Sequoia S.A. Lausanne, CH, vol. 517, No. 14, pp. 4138-4142 (May 29, 2009).

International Search Report in PCT/EP2010/007916, Oct. 25, 2011.
International Preliminary Report on Patentability in PCT/EP2010/007916, Jan. 15, 2013.
Search Report in German Application No. 10 2010 026 627.2, Oct. 28, 2010.
International Search Report in related PCT/EP2011/003399, Oct. 25, 2011.

* cited by examiner

SECURITY FEATURE

BACKGROUND OF THE INVENTION

A. Field of the Invention

This invention relates to a security feature and a method for checking the security feature. Such security features are used for safeguarding value documents, in particular for authenticating the value documents.

B. Related Art

For safeguarding value documents, the latter are equipped with security features and/or with security elements having security features in order to make it possible to check the authenticity of the value document. The security features and security elements serve as protection from unauthorized reproduction of the value documents. As security elements there are used for example security threads or foil elements which are connected to a value document. The security features can be connected to the substrate of the security element or to the substrate of the value document itself.

As security features there are employed for example luminescent pigments which consist of a host lattice doped with a luminophore. Optical transitions of the luminophores lead to a luminescence of the luminescent pigment. For the authenticity check of a value document having the luminescent pigment, it is checked for example whether the value document has the desired luminescence and it is decided in dependence thereon whether or not the value document is authentic.

To make it more difficult to imitate the value documents, the latter are provided with a security feature made of a luminescent pigment which, upon corresponding optical excitation, shows a characteristic luminescence spectrum with several luminescence peaks. However, the luminescence spectrum of such a security feature can in some cases be simulated by another luminescent pigment which does not deliver the identical luminescence spectrum to the security feature, but a similar one. To obtain a sufficiently similar luminescence spectrum, it is not absolutely necessary to hit upon the identical chemical composition of the luminescent pigment. For slight deviations from the chemical composition of the security feature usually do not have a strong effect on the obtained luminescence spectrum.

An object of the present invention is hence to specify a security feature with a luminescent pigment whose luminescence spectrum is difficult to imitate.

SUMMARY

The security feature contains a luminescent pigment which has a host lattice doped with a luminophore and which is optically excitable to emit luminescent light. The luminescent light of the luminescent pigment has a luminescence spectrum with at least a first luminescence peak and at least a second luminescence peak whose peak intensities respectively depend on an amount fraction x of the luminophore in the luminescent pigment. Hereinafter the peak intensity of the first luminescence peak A will be designated as $I_A(x)$ and that of the second luminescence peak B as $I_B(x)$. The first and second peak intensities are both changeable by a change of the amount fraction x of the luminophore. In the luminescent pigment according to the invention, the host lattice and the luminophore and the amount fraction x of the luminophore are chosen such that for the peak intensity $I_A(x)$ of the first luminescence peak and the peak intensity $I_B(x)$ of the second luminescence peak as a function of the amount fraction x of the luminophore, the following relation holds at the amount fraction x which the luminophore has in the luminescent pigment:

$$\left| \frac{d}{dx}\left( \frac{I_A(x) - I_B(x)}{I_A(x) + I_B(x)} \right) \right| \geq F, \qquad (1)$$

where the parameter amounts to F=10. The peak intensity $I_A$ of the first luminescence peak and the peak intensity $I_B$ of the second luminescence peak are changeable by a change of the amount fraction x of the luminophore such that for the peak intensities $I_A(x)$ and $I_B(x)$ as a function of the amount fraction x of the luminophore, the above-mentioned relation (1) holds at the amount fraction x which the luminophore has in the luminescent pigment.

Hereinafter the quotient of the difference of the first and second peak intensities and the sum of the first and second peak intensities will be designated as the luminescence peak contrast K, i.e.

$$K = \frac{I_A(x) - I_B(x)}{I_A(x) + I_B(x)}.$$

In the security feature according to the invention, the absolute value of the first derivative of the luminescence peak contrast K with respect to the amount fraction x of the luminophore yields at least 10. This has the consequence that even a slight increase or reduction of the amount fraction x of the luminophore leads to a strong relative change of the peak intensities $I_A$ and $I_B$. The parameter F forms a minimum value for the absolute value of the derivative of the luminescence peak contrast K with respect to the amount fraction x of the luminophore which the security features according to the invention reach or exceed.

For checking whether a considered luminescent pigment fulfills the above-mentioned relation, one can draw on several further luminescent pigments which differ from the considered luminescent pigment exclusively with respect to the amount fraction x of the luminophore, while all other properties of the further luminescent pigments and of the considered luminescent pigment are identical. The further luminescent pigments contain amount fractions x1, x2, etc., slightly deviating from the considered luminescent pigment, with suitably great deviations from the amount fraction x, which can lie e.g. in the percent range. From the respective luminescence spectra resulting upon identical optical excitation of these luminescent pigments there can respectively be determined the peak intensities $I_A$ and $I_B$ for the different amount fractions x1, x2, etc. In the case of several slightly different amount fractions there results therefrom a continuous dependence of the two peak intensities $I_A(x)$ and $I_B(x)$ on the amount fraction x. Subsequently, the difference and the sum of the two peak intensities $I_A(x)$ and $I_B(x)$ and their quotient are formed in order to determine the luminescence peak contrast K. The absolute value of the first derivative of the luminescence peak contrast K with respect to the amount fraction x of the luminophore is compared with the parameter F. In this way it can be checked whether or not the luminescence of a luminescent pigment has the strong dependence according to the invention on the amount fraction x of the luminophore.

The amount fraction x of the luminophore refers to the quantitative relative fraction of the luminophore in the luminescent pigment. The amount fraction x of a luminophore is the relative number of the luminophore particles (atoms, ions)

in the total particle number which the luminescent pigment has according to its empirical formula. Hence, from the concentration parameter z with which the luminophore amount is stated in the empirical formula of the luminescent pigment, the amount fraction x of the luminophore is computed by means of division by the total number of particles (atoms, ions) stated in the empirical formula.

In the luminescent pigment of the security element, even a slight increase or reduction of the amount fraction x of the luminophore causes a great change of the luminescence peak contrast K. This strong dependence has the advantage that the forgery-proofness of the luminescent pigment is increased. For even if the correct ingredients of the authentic luminescent pigment should be found for the purpose of imitation, the amount fraction of the luminophore must be hit upon very precisely to obtain a luminescence spectrum coming sufficiently close to that of the security feature.

In the security feature according to the invention, the first and second luminescence peaks are emitted by a single luminescent pigment. The first and second luminescence peaks are thus contained in the luminescence spectrum of the luminescent light which the luminescent pigment emits by reason of its optical excitation. For example, the first and second luminescence peaks can result from different electronic transitions of the same luminescent pigment. In the luminescent pigment according to the invention, the first and second luminescence peaks are thus not emitted by two different luminescent pigments which are present e.g. as a mixture of luminescent pigments or spatially separate from each other, but by a single luminescent pigment.

Compared with hitherto known security features consisting of a mixture of two luminescent pigments, the security feature according to the invention preferably has a luminescence spectrum defined intrinsically by the composition of the luminescent pigment. For in a mixture of two luminescent pigments respectively having a luminophore with a characteristic luminescence peak, the intensity ratio of the luminescence peaks of the two luminophores depends on the fraction of the two luminescent pigments in the pigment mixture. Mixing different luminescent pigments has the disadvantage, however, that the different luminescent pigments of the mixture can segregate again, e.g. due to different grain sizes or different density. Such a segregation of the luminescent pigments of a security feature can take place in particular due to vibrations during transport of the security feature or also during processing of the security feature for application to the value document. Segregation results in an inhomogeneity of the pigment mixture, which can lead to unintended spatial variations of the luminescence of the security feature on the value document. Such variations can lead to a false assessment of authentic value documents or to a "softening" of the authenticity requirements by which the detection of forgeries is impaired. With previous security features consisting of a mixture of several luminescent pigments, the homogeneity of the pigment mixture must hence usually be ensured with great effort. This is not necessary with the security feature according to the invention.

Preferably, the absolute value of the first derivative of the luminescence peak contrast K with respect to the amount fraction x of the luminophore amounts to at least 10, preferably at least 40, particularly preferably at least 150, according to the parameter F=10, F=40 and F=150, respectively. The greater absolute value of the first derivative is advantageous, because it means a greater sensitivity of the luminescence peak contrast and thus of the luminescence spectrum to variations of the amount x of the luminophore. The above-mentioned advantages of the security feature according to the invention are then all the greater.

Preferably, luminescent pigments employed for safeguarding purposes are hence ones in which the amount fraction lies in a range in which at least the parameter F is obtained according to relation (1), because even a small deviation of the stoichiometry causes a strong change of the luminescence here. In ranges of the amount fraction in which the absolute value of the first derivative of the luminescence peak contrast K undershoots the value F, there is only a small or no change of the luminescence peak contrast with the amount fraction. It is thus possible in these ranges to obtain luminescent pigments with a similar luminescence spectrum without knowing the exact stoichiometry of the authentic security feature. A forgery of security features by imitating the luminescent pigment is hence considerably simpler with previous security features.

A change of the amount fraction x can have the consequence that both peak intensities increase or both decrease. It is preferred that the peak intensity of one of the two luminescence peaks decreases with increasing amount fraction x of the luminophore, because such a behavior is unusual in comparison to previous luminescent pigments. A peak intensity decreasing with increasing amount fraction is found in particular in that one of the two luminescence peaks with the smaller peak wavelength. Additionally, the peak intensity $I_A$ or $I_B$ of one of the two luminescence peaks can increase with increasing amount fraction x. A peak intensity increasing with increasing amount fraction is found in particular in that one of the two luminescence peaks with the greater peak wavelength.

The luminophore can be distributed over a partial region of the host lattice. However, luminescent pigments in which the luminophore is distributed over the entire host lattice of the luminescent pigment are preferred, because in this case the manufacturing expense for the luminescent pigment is low. In the luminescent pigments according to the invention, the luminescence spectrum varies strongly in dependence on the exact amount fraction of the luminophore. Local variations of the luminophore fraction within the host lattice can then lead to locally slightly different peak intensities. Hence, it is preferred that the luminophore is distributed homogeneously in the host lattice of the luminescent pigment.

In a first embodiment example, the first and second luminescence peaks are emitted by the same luminophore. For example, the first and second luminescence peaks result from electronic transitions of the same luminophore. The host lattice of the luminescent pigment can, in addition to the luminophore emitting the two luminescence peaks, be doped with one or several further dopants. The further dopants can be further luminophores or other dopants.

In a second embodiment example, the first and second luminescence peaks are emitted by two different luminophores with which the host lattice of the luminescent pigment is doped. In particular, the first and second luminescence peaks can result from electronic transitions of two different luminophores with which the host lattice of the luminescent pigment is doped. The first luminescence peak of the luminescence spectrum is then emitted by a first luminophore and the second luminescence peak by a second luminophore with which luminophores the host lattice of the luminescent pigment is doped. The amount fractions of the two luminophores can be equal or different. If the amount fractions of the first luminophore and of the second luminophore are different, the first luminophore refers to that one of the first and second luminophores whose amount fraction in the luminescent pigment is lower, and the amount fraction x of the luminophore refers to this lower amount fraction of the first luminophore. The amount fraction of the second luminophore is designated by y. For determining the peak intensities $I_A(x)$ and $I_B(x)$ as a function of the amount fraction x of the first luminophore and for determining the first derivative with respect to the amount fraction x, the ratio of the amount fractions (x:y) of the first and second luminophores is kept constant.

The first and second luminophores are contained in the same volume region of the luminescent pigment. Preferably, the first as well as the second luminophore are distributed substantially homogeneously in this volume region of the luminescent pigment. The first and second luminophores can be distributed over a partial region of the host lattice. In this connection the spatial distributions of the first and second luminophores can overlap completely or partly. However, luminescent pigments in which the first and second luminophores are distributed over the entire host lattice of the luminescent pigment are preferred, because in this case the manufacturing expense for the luminescent pigment is low.

In both embodiment examples it is also possible that the respective luminescent pigment additionally has one or several further luminophores which likewise emit two luminescence peaks behaving in accordance with relation (1) according to the invention. The luminophores of the two embodiment examples can also be used with each other, within the same luminescent pigment. In both cases it is then preferred that the luminescence peaks of the different luminophores do not overlap spectrally with each other.

In contrast to previous luminescent pigments, a change of the amount fraction x of the luminophore in the luminescent pigment makes its luminescence spectrum changeable qualitatively, i.e. the peak intensities do not scale uniformly in the luminescent pigment according to the invention, but rather the ratio of the peak intensities of the first and second luminescence peaks changes upon a change of the amount fraction x of the luminophore. Especially suitable are luminescent pigments with an amount fraction x of the luminophore at which a change of the amount fraction x makes the peak intensities of the first and second luminescence peaks changeable in a manner oppositely oriented to each other. In this connection, a change of the amount fraction x of the luminophore makes either the peak intensity of the first luminescence peak increasable and simultaneously the peak intensity of the second luminescence peak reducible, or the peak intensity of the first luminescence peak reducible and simultaneously the peak intensity of the second luminescence peak increasable. In the first embodiment example the oppositely oriented change of the peak intensities results exclusively from the change of the amount fraction x of the luminophore, the luminescent pigment otherwise remaining unchanged.

In certain cases of the first embodiment example, however, the luminophore cannot be inserted in the lattice of the luminescent pigment charge-neutrally without producing unwanted defects. In order not to produce such defects upon a change of the amount fraction of the luminophore, there is in such cases preferably incorporated into the luminescent pigment an additional dopant, which is not a luminophore itself, in order to compensate the charge of the luminophore. Upon a change of the amount fraction of the luminophore, the amount of the compensatory dopant is adapted relative to the changed amount fraction x of the luminophore in order to prevent a change of the luminescent pigment by otherwise arising defects. In such a case, for determining the peak intensities $I_A(x)$ and $I_B(x)$ as a function of the amount fraction x of the luminophore and for determining the first derivative with respect to the amount fraction x, the ratio of the amount fractions x to the amount fraction of this dopant is kept constant. The oppositely oriented change of the two peak intensities results in these cases from the change of the amount fraction x of the luminophore, with at most the amount fraction of such an additional dopant being accordingly adapted and the luminescent pigment otherwise remaining unchanged.

In the second embodiment example, the oppositely oriented change of the peak intensities results exclusively from the change of the amount fractions x, y of the first and second luminophores, with the ratio of the two amount fractions x and y being kept constant and the luminescent pigment otherwise remaining unchanged, however. Hence, in the second embodiment example the peak intensities of the first and second luminescence peaks are changeable in a manner oppositely oriented to each other by a change of the amount fraction x of the first luminophore upon which change the ratio of the amount fractions (x:y) of the first and the second luminophore in the luminescent pigment is kept constant.

The peak wavelength of the first luminescence peak and the peak wavelength of the second luminescence peak are preferably spaced apart spectrally at least 20 nm, particularly preferably at least 30 nm. Hence, the two luminescence peaks can be easily distinguished from each other spectrally upon the check of the security feature. Preferably, the peak wavelengths of the first and second luminescence peaks lie in the near infrared spectral region, in particular in the spectral region between 750 nm and 2900 nm, preferably between 800 nm and 2200 nm. Particularly the near infrared spectral region is preferred, because these wavelengths lie outside the visible spectral region, so that an inconspicuous use of the security feature is possible. Depending on which host lattice and which first and second luminophores are employed, the luminescent pigment can be optically excitable to emit the luminescent light by irradiating with light in the ultraviolet or in the visible spectral range or in the near infrared spectral region. Depending on the type of the chosen luminophore or luminophores, and in dependence on the optical excitation, further luminescence peaks can also be emitted besides the two luminescence peaks. The peak wavelengths of the first and the second luminescence peak are preferably shifted to greater wavelengths (Stokes emission) in comparison to the optical excitation of the luminescent pigment. This is advantageous in relation to the reverse case, when the optical excitation lies at a greater wavelength than the luminescence peaks (anti-Stokes emission, as found e.g. in upconverter luminescent pigments), because higher luminescence intensities are attainable with Stokes emission than with an anti-Stokes emission. In contrast to upconverter luminescent pigments, even a small amount of the luminescent pigment is hence sufficient, with the luminescent pigments according to the invention, for obtaining readily recognizable peak intensities.

The luminescent pigment consists e.g. of a doped host lattice which is doped at least with a luminophore. The amount fraction x of the luminophore in the luminescent pigment lies e.g. between at least 50 ppm and at most 10,000 ppm, in particular between at least 50 ppm and at most 5,000 ppm. The host lattice can additionally also be doped with other dopants which do not luminesce, e.g. with dopants that are required for crystallization or for preventing defects in the crystal. The luminescent pigment can be configured for example as a powder whose particles consist of the doped host lattice. The particles can e.g. have a grain size in the range of 1 to 20 µm, preferably <6 µm.

The luminophore with which the host lattice is doped, or the first and/or the second luminophore with which the host lattice is doped, is/are preferably selected from the rare earth ions, in particular from the rare earth ions, erbium, holmium, neodymium, thulium, ytterbium. The host lattice is preferably configured as an inorganic host lattice. In particular, the host lattice can have a perovskite structure or a garnet structure. For example, the host lattice is an yttrium aluminum garnet or a mixed garnet derived therefrom. When the host lattice has a garnet structure or a perovskite structure, it preferably also contains one or several of the elements, vanadium, chromium, manganese, iron, cobalt or nickel as an absorbent element. The host lattice can also be an oxide or a mixed lattice with oxide ions, for example a wolframate, phosphate, niobate, tantalate, silicate or aluminate.

The properties according to the invention are achieved only with certain compositions of the luminescent pigment, i.e. with certain luminophores, certain amount fractions of the luminophore, certain combinations of luminophore and host lattice and—in the second embodiment example—certain combinations of the two luminophores. The choice of a different luminophore, a different amount fraction or a different host lattice generally leads to a luminescent pigment not having the properties according to the invention.

Several of the luminescent pigments according to the invention which have different peak intensities of the first and second luminescence peaks can be employed for manufacturing security features with different codings, e.g. in order to provide different kinds of value documents with different codings. While there is employed for a first security feature a luminescent pigment having a certain ratio of the first and second peak intensities, further security features are respectively given a luminescent pigment with a ratio of the first and second peak intensities that deviates therefrom, with the spectral position of the luminescence peaks being as in the first security feature. For coding different value documents there can of course also be employed security features that contain different or also several of the luminescent pigments according to the invention at the same time. For example, security features can be coded with different varieties of the luminescent pigments according to the invention whose first and second luminescence peaks respectively lie at different wavelengths.

The invention moreover relates to a security element having a security feature according to the invention. The security element is intended to be applied to a value document or incorporated into a value document. The security feature is e.g. a security strip, a security thread, a security band or a transfer element for applying to a value document. Further, the security feature can be admixed to a printing ink which is intended e.g. for applying to a value document. The printing ink containing the security feature can be imprinted on the value document e.g. in one or several certain regions. The security feature can also be incorporated into the value document, e.g. by being admixed to the substrate material of the value document, in particular a paper or plastic substrate, upon the manufacture thereof.

The invention moreover relates to a security paper and a value document into which a security feature according to the invention is applied or incorporated and/or which has a security element provided with the security feature and/or a printing ink with the security feature. The security feature can be admixed to the security paper upon the manufacture of the security paper. The security feature can be applied over the full area or over part of the area, e.g. in the form of characters or patterns, to a surface of the value document or of the security paper or of the security element. Different portions of the value document or of the security paper or of the security element can be provided with security features with different coding.

The invention also relates to a method for recognizing the security feature wherein an optical excitation of the luminescent pigment is carried out in order to optically excite the luminescent pigment to emit the luminescent light, and wherein the intensities of the first and second luminescence peaks contained in the luminescence spectrum of the luminescent pigment are detected. These detected intensities of the luminescence peaks may be the peak intensities or the intensity spectrally integrated over the respective luminescence peak. The optical excitation of the luminescent pigment is effected by irradiating the security feature with light in which the luminescent pigment of the security feature absorbs, e.g. with light of the near infrared spectral region. For recognizing the security feature, the detected intensities of the first and the second luminescence peak are evaluated in order to check the authenticity of the security feature or the security element, of the printing ink or of the value document. The irradiating of the security feature with light and the detecting of the intensities as well as optionally also the evaluating are carried out by a sensor configured therefor.

The value documents to be safeguarded are for example bank notes, checks, identity cards, passports, credit cards, check cards, tickets, vouchers, shares, deeds, tokens, etc.

DESCRIPTION OF THE DRAWINGS

Hereinafter the invention will be explained by way of example with reference to the following figures. There are shown.

DETAILED DESCRIPTION

Figure 1A:
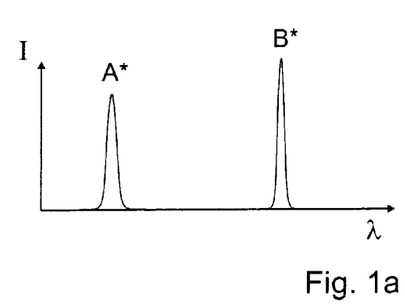
FIGS. 1a, b Luminescence spectra of conventional luminescent pigments: a) of a luminescent pigment with a first amount fraction of the luminophore, b) of a luminescent pigment with a second amount fraction of the luminophore, FIGS. 2a, b Luminescence spectra of luminescent pigments according to the invention: a) of a luminescent pigment with a first amount fraction x1 of the luminophore, b) of a luminescent pigment with a second amount fraction x2 of the luminophore, FIG. 3a Course of the peak intensity of the two luminescence peaks of the luminescent pigment of a first example as a function of the amount fraction x of the luminophore, FIG. 3b Luminescence peak contrast K as a function of the amount fraction of the luminophore x for the first example, FIG. 3c First derivative of the luminescence peak contrast K with respect to the amount fraction x of the luminophore for the first example.
Figure 1B:
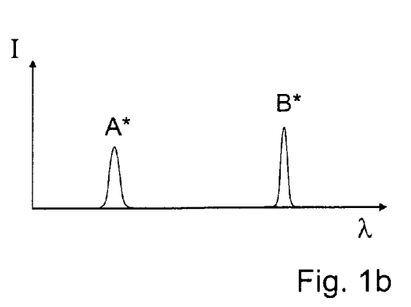

In FIGS. 1a and 1b there is respectively shown the luminescence spectrum of a conventional luminescent pigment consisting of two luminescence peaks A*, B*. The luminescence peaks A*, B* result e.g. from electronic transitions of a luminophore employed for doping the luminescent pigment. The luminescent pigments of FIGS. 1a and 1b consist of the same host lattice and luminophore and differ solely by the amount fraction of the luminophore. The luminescent pigment from FIG. 1a has a higher amount fraction of the luminophore in this example than the luminescent pigment from FIG. 1b. The different amount fraction of the luminophore leads to a change of the luminescence spectrum. In this connection, the peak intensity I of the luminescence peaks A*, B* usually rises proportionally with the amount fraction of the luminophore. Thus, the peak intensity of the luminescence peak A* as well as of the luminescence peak B* is about twice as great in the luminescent pigment in FIG. 1a as in the luminescent pigment in FIG. 1b. In spite of the changed amount fraction of the luminophore, the intensity ratio of the two luminescence peaks A and B thus remains approximately the same. With this behavior the luminescence peak contrast K as a function of the amount fraction remains constant and the first derivative according to relation (1) is infinitesimally low.

In practice, the first derivative of the luminescence peak contrast K can be ascertained using a sample series for the luminescent pigment, with the amount fractions of the luminophore x being varied within the sample series. If the luminescence peak contrast K is respectively determined from the luminescence spectrum of each sample of the sample series, and plotted in dependence on the amount fraction of the luminophore x of the respective sample, the first derivative employable for checking relation (1) results from the slope of the thereby arising function.

Figure 2A:
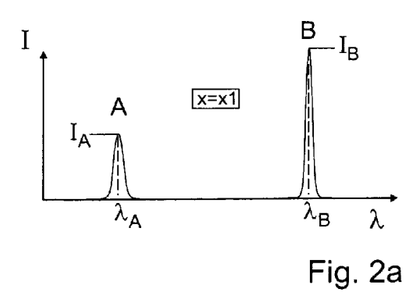

FIG. 2a shows the luminescence spectrum of a first luminescent pigment P according to the invention on the basis of a host lattice doped with a luminophore L, with a first amount fraction x1 of the luminophore. FIG. 1b shows the luminescence spectrum of a second luminescent pigment P' on the basis of the host lattice doped with the same luminophore L, with a second amount fraction of the luminophore x2, which, depending on the kind of the luminescent pigment, is somewhat greater or somewhat lower than x1. The luminescent pigments P, P' consist of the same host lattice and luminophore and differ solely by the amount fraction of the luminophore L. In both spectra of FIGS. 2a, 2b there are respectively contained two luminescence peaks A, B of the luminophore L which differ in their intensity and their intensity ratio. The shape of the spectra in FIGS. 2a, 2b is represented only schematically. In particular, the shape and width of the luminescence peaks can deviate from this representation.

Figure 2B:
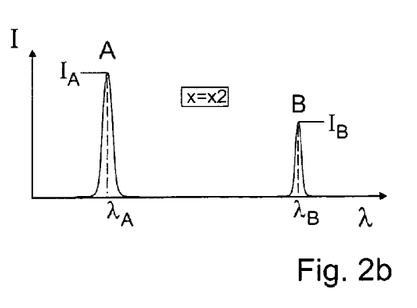

The different amount fractions x1, x2 of the luminophore L lead to a non-uniform change of the luminescence spectrum. While the peak intensity of the luminescence peak A is greater with the amount fraction x2 than with the amount fraction x1, the peak intensity of the luminescence peak B is smaller with the amount fraction x2 than with the amount fraction x1, cf. FIGS. 2a, 2b. The changed amount fraction of the luminophore L leads to the intensity ratio of the two luminescence peaks A and B strongly changing. In dependence on the amount fraction of the luminophore L there thus results a qualitative change of the luminescence spectrum. Upon a change of the amount fraction of the luminophore L the intensities of the luminescence peaks A, B change in a manner oppositely oriented to each other. Thus, upon a change of the amount fraction of the luminophore from x1 to x2 the luminescence peak A becomes stronger at the expense of the luminescence peak B. The relative change of the peak intensities as a function of the amount fraction x of the luminophore is especially great in the security feature according to the invention.

Example 1

$Li_{1-z}Tm_zNb_{1-2z}Ti_{2z}O_3$

For manufacturing the luminescent pigment, the corresponding amounts of lithium carbonate, thulium oxide, niobium oxide and titanium oxide are mixed with each other intimately in an agate mortar according to the following Table 1. Subsequently, the mixture is annealed in a corundum crucible for 8 h at 1150° C.

TABLE 1

| Sample | z | x | $Li_2CO_3$ | $Tm_2O_3$ | $Nb_2O_5$ | $TiO_2$ |
|---|---|---|---|---|---|---|
| 1-1 | 0.0025 | 0.0005 | 2.168 g | 0.0284 g | 7.780 g | 0.0234 g |
| 1-2 | 0.005 | 0.001 | 2.161 g | 0.0567 g | 7.735 g | 0.0470 g |
| 1-3 | 0.01 | 0.002 | 2.147 g | 0.1133 g | 7.646 g | 0.0938 g |
| 1-4 | 0.015 | 0.003 | 2.133 g | 0.1696 g | 7.556 g | 0.1405 g |
| 1-5 | 0.02 | 0.004 | 2.119 g | 0.2259 g | 7.468 g | 0.1870 g |
| 1-6 | 0.03 | 0.006 | 2.091 g | 0.3378 g | 7.291 g | 0.2797 g |
| 1-7 | 0.04 | 0.008 | 2.063 g | 0.4491 g | 7.115 g | 0.3719 g |
| 1-8 | 0.05 | 0.01 | 2.036 g | 0.5597 g | 6.940 g | 0.4635 g |

Figure 3A:
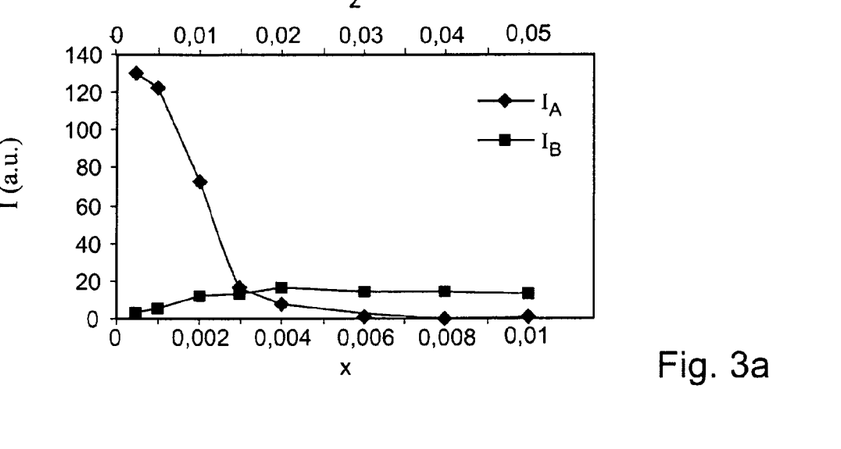
Figure 3B:
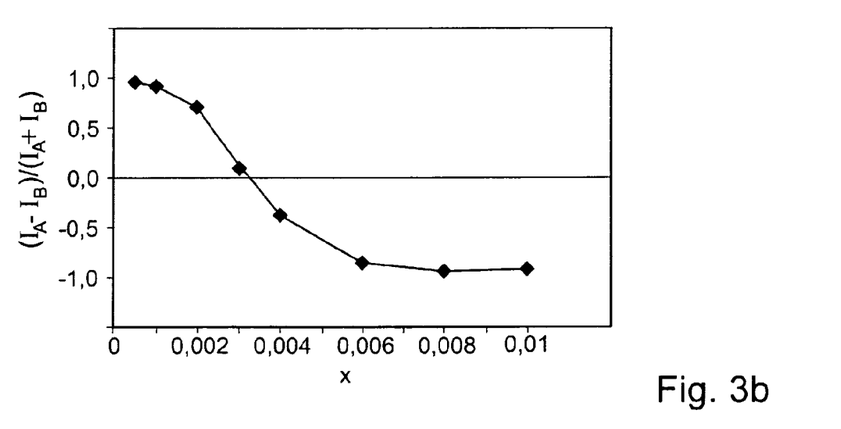
Figure 3C:
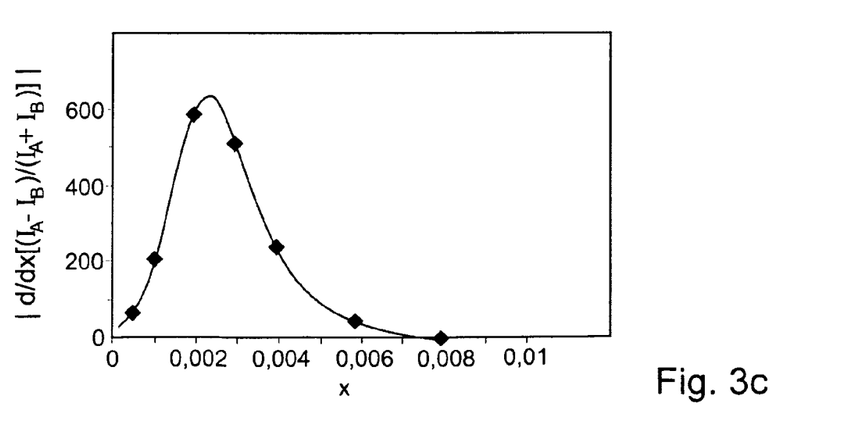

FIG. 3 shows the course of the peak intensities $I_A$ and $I_B$ of two luminescence peaks A, B of the luminescent pigment $Li_{1-z}Tm_zNb_{1-2z}Ti_{2z}O_3$ as a function of the concentration parameter z, which is stated in the diagram on the upper horizontal axis. On the lower horizontal axis there is stated the amount fraction x therefor, which results in this case from the concentration parameter z by means of division by the factor of 5, due to the number of 5 atoms in the empirical formula $Li_{1-z}Tm_zNb_{1-2z}Ti_{2z}O_3$. An amount fraction x=0.001 is equivalent to a luminophore fraction based on the host lattice of 1000 ppm (parts by million). The two considered luminescence peaks A, B are emitted by the luminophore Tm as a result of an optical excitation of the luminescent pigment at 780 nm. The luminescence peak A lies at a wavelength $\lambda_A$ of about 798 nm, and the luminescence peak B at a wavelength $\lambda_B$ of about 1758 nm. In the considered range of the amount fraction x the peak intensity $I_A$ of the luminescence peak A drops with an increasing amount fraction x of the luminophore, while the peak intensity of the luminescence peak B increases. The luminescence peak contrast $K=(I_A-I_B)/(I_A+I_B)$ drops accordingly from about +0.95 at an amount fraction x=0.0005 to about −0.91 at an amount fraction x=0.01, cf. FIG. 3b. The diagram of FIG. 3c shows the absolute value of the first derivative of the luminescence peak contrast K with respect to the amount fraction x. The derivative values, i.e. the change of the luminescence peak contrast K as a function of the amount fraction x, lie over 40 for x=0.001 to x=0.006 and amount to up to about 600.

Example 2

$Y_{2-5z}(Nd_1Yb_4)_zSiO_5$

As a second example, the luminescent pigment $Y_{2-5z}$ $(Nd_1Yb_4)_zSiO_5$ will be considered. For its manufacture the corresponding amounts of urea, silicon dioxide, and yttrium nitrate hexahydrate are dissolved in 3 mL water according to the following Table 2. Subsequently, the corresponding amounts of neodymium nitrate hexahydrate and ytterbium nitrate pentahydrate are dissolved together in water, then added to the reaction mixture and mixed. The reaction mixture is evaporated on a hot plate at 500° C. Subsequently, the obtained material is transferred to a corundum crucible and annealed in the oven at 1500° C. for 10 h.

TABLE 2

| Sample | z | x | Y(NO$_3$)$_3$*6H$_2$O | Urea | SiO$_2$ | Nd(NO$_3$)$_3$*6H$_2$O | Yb(NO$_3$)$_3$*5H$_2$O |
|---|---|---|---|---|---|---|---|
| 2-1 | 0.0005 | 0.0000625 | 6.791 g | 2.665 g | 0.533 g | 0.0019 g | 0.0080 g |
| 2-2 | 0.001 | 0.000125 | 6.781 g | 2.665 g | 0.533 g | 0.0039 g | 0.0159 g |
| 2-3 | 0.0025 | 0.0003125 | 6.753 g | 2.664 g | 0.533 g | 0.0097 g | 0.0398 g |
| 2-4 | 0.004 | 0.0005 | 6.725 g | 2.663 g | 0.533 g | 0.0155 g | 0.0637 g |
| 2-5 | 0.005 | 0.000625 | 6.706 g | 2.662 g | 0.533 g | 0.0194 g | 0.0796 g |
| 2-6 | 0.006 | 0.00075 | 6.687 g | 2.661 g | 0.532 g | 0.0233 g | 0.0955 g |
| 2-7 | 0.007 | 0.000875 | 6.668 g | 2.660 g | 0.532 g | 0.0272 g | 0.1114 g |
| 2-8 | 0.01 | 0.00125 | 6.612 g | 2.658 g | 0.532 g | 0.0388 g | 0.1590 g |

The luminescent pigment contains in this example with Yb and Nd two luminophores L1, L2. By optical excitation of the luminescent pigment with light of a wavelength of 532 nm, the luminescent pigment samples 2-1 to 2-8 respectively emit a first luminescence peak A at a wavelength $\lambda_A$ of 1075 nm, which is emitted by the first luminophore, neodymium, and a second luminescence peak B at $\lambda_B$=978 nm, which is emitted by the second luminophore, ytterbium. The eight luminescent pigment samples 2-1 to 2-8 differ solely by the amount fractions of the luminophores L1, L2. The amount fraction x is computed in this case from the concentration parameter z by means of division by 8, in accordance with the total number of atoms in the empirical formula $Y_{2-5z}(Nd_1Yb_4)_z SiO_5$.

According to the empirical formula, the amount fraction of the second luminophore L2 (Yb) always amounts to four times the amount fraction x of the first luminophore L1 (Nd). If the amount fractions of the two luminophores are different in a luminescent pigment, that one of the two luminophores of the luminescent pigment is considered as the first luminophore L1 that has the lower amount fraction. Therefore, the luminescence peak contrast $K=(I_A-I_B)/(I_A+I_B)$ as a function of the amount fraction x of the first luminophore L1 (Nd) is considered. The dependence of the luminescence peak contrast K on the amount fraction x is determined under the condition that the amount fraction x of the first luminophore L1 (Nd) is in a constant ratio to the amount fraction of the second luminophore L2 (Yb). In Example 2 this ratio amounts constantly to 4, in accordance with the empirical formula. The first derivative of the luminescence peak contrast K with respect to the amount fraction x of the first luminophore L (Nd) is also determined under the condition that the amount fraction x of the first luminophore L1 (Nd) is in the constant ratio 4 to the amount fraction of the second luminophore L2 (Yb).

With the amount fractions x according to Table 2 there is found for the luminescence peaks A, B an intensity ratio that is strongly dependent on the amount fraction x of the first luminophore L1. Hence, the luminescent pigment samples 2-1 to 2-8 are very well distinguishable from each other on the basis of the intensity ratio or the luminescence peak contrast K. The luminescence peak contrast $K=(I_A-I_B)/(I_A+I_B)$ of the first luminescence peak A at 1075 nm and of the second luminescence peak B at 978 nm amounts to K=+0.84 for the luminescent pigment sample 2-1, as well as K=+0.75; K=+0.50; K=+0.33; K=+0.17; K=+0.10; K=+0.02; K=−0.26 for the respective luminescent pigment samples 2-2 to 2-8. The absolute value of the first derivative of the luminescence peak contrast K with respect to the amount fraction x of the first luminophore L1 (Nd) lies at more than 150 in all eight luminescent pigments.

The invention claimed is:

1. A security feature for safeguarding value documents, comprising: a luminescent pigment which has a host lattice doped with a luminophore (L, L1) and which is optically excitable to emit luminescent light,
the luminescent light of the luminescent pigment having a luminescence spectrum with at least a first luminescence peak (A) and at least a second luminescence peak (B)
said first and second peaks having first and second peak intensities ($I_A$(x), $I_B$(x)) respectively depending on an amount fraction of the luminophore (L, L1) in the luminescent pigment,
wherein the host lattice and the luminophore (L, L1) and the amount fraction x of the luminophore (L, L1) are chosen such that for the first peak intensity $I_A$(x) of the first luminescence peak (A) and the second peak intensity $I_B$ (x) of the second luminescence peak (B) as a function of the amount fraction x of the luminophore (L, L1), the following relation holds:

$$\left| \frac{d}{dx}\left( \frac{I_A(x) - I_B(x)}{I_A(x) + I_B(x)} \right) \right| \geq F,$$

where F is at least 10.

2. The security feature according to claim 1, wherein the parameter amounts to F=40.

3. The security feature according to claim 1, wherein that the peak intensity ($I_A$) of the first luminescence peak (A) and the peak intensity ($I_B$) of the second luminescence peak (B) have an intensity ratio to each other which is defined intrinsically by the composition of the luminescent pigment.

4. The security feature according to claim 1, wherein the peak intensity ($I_A$ or $I_B$) of one of the two luminescence peaks (A or B) decreases with an increasing amount fraction x.

5. The security feature according to claim 1, wherein a change of the amount fraction x of the luminophore (L, L1) makes the peak intensities ($I_A$, $I_B$) of the first and second luminescence peaks (A, B) changeable in a manner oppositely oriented to each other.

6. The security feature according to claim 1, wherein the luminophore (L, L1) is distributed substantially homogeneously in the host lattice.

7. The security feature according to claim 1, wherein the first and second luminescence peaks (A, B) are emitted by the same luminophore (L).

8. The security feature according to claim 1, wherein the luminophore is a first luminophore (L1) with which the host lattice is doped, and the amount fraction x is the amount fraction of the first luminophore (L1) in the luminescent pigment, and the host lattice is additionally doped with a second luminophore (L2) whose amount fraction y in the luminescent pigment is equal to or greater than the amount fraction x of the first luminophore (L1), and the first luminescence peak (A) of the luminescence spectrum is emitted by the first luminophore (L1) and the second luminescence peak (B) of the luminescence spectrum by the second luminophore (L2), and for determining the peak intensities ($I_A(x)$, $I_B(x)$) as a function of the amount fraction x of the first luminophore and for determining the first derivative $$\frac{d}{dx}\left(\frac{I_A(x) - I_B(x)}{I_A(x) + I_B(x)}\right)$$

with respect to the amount fraction x of the first luminophore (L1), the ratio (x:y) of the amount fractions (x, y) of the first and the second luminophore (L1, L2) in the luminescent pigment is kept constant.

9. The security feature according to claim 1, wherein the first and second luminescence peaks (A, B) have peak wavelengths ($\lambda_A$, $\lambda_B$) which are spaced apart spectrally at least 20 nm.

10. The security feature according to claim 1, wherein the peak wavelengths ($\lambda_A$, $\lambda_B$) of the first and second luminescence peaks (A, B) lie in the near infrared spectral region.

11. The security feature according to claim 1, wherein the luminophore is selected from rare earth ions.

12. The security feature according to claim 1, wherein the host lattice is configured as an inorganic host lattice, the host lattice being a host lattice with a garnet structure or with a perovskite structure or being an oxide or a mixed lattice with oxide ions, including at least one of a wolframate or phosphate or niobate or tantalite or silicate or aluminate.

13. A security element or printing ink comprising one or several of the security feature recited in claim 1.

14. A value document or security paper comprising at least one of:
   one or several of the security features recited in claim 1.

15. A method for recognizing a security feature recited in claim 1, comprising the steps:
   the security feature is irradiated with light of a spectral region in which the luminescent pigment of the security feature absorbs, in order to optically excite the luminescent pigment to emit the luminescent light, and
   intensities of the first and second luminescence peaks (A, B) contained in the luminescence spectrum of the luminescent light are detected, and
   for recognizing the security feature, the detected intensities of the first and second luminescence peaks (A, B) are evaluated.

* * * * *